United States Patent

[11] 3,602,771

| [72] | Inventors | Dennis C. Winfield Walstad;<br>Dale F. Aurora Willcox; Walter Robert Knopf, all of Geneva, Ill. |
|---|---|---|
| [21] | Appl. No. | 865,776 |
| [22] | Filed | Oct. 13, 1969 |
| [45] | Patented | Aug. 31, 1971 |
| [73] | Assignee | Furnas Electric Company<br>Batavia, Ill. |

[54] SOLID STATE DEENERGIZER HAVING CURRENT SENSING LOOPS
5 Claims, 4 Drawing Figs.

[52] U.S. Cl. .................................................. 317/13 R,
317/22, 336/175, 317/33 SC, 317/36 TD, 317/142
TD, 317/154
[51] Int. Cl. ...................................................... H02h 3/08,
H01h 47/18
[50] Field of Search .......................................... 317/13 R,
22, 33, 33 SC, 36 TD, 142 TD, 154, ; 336/175

[56] References Cited
UNITED STATES PATENTS

| 3,119,951 | 1/1964 | Davy .......................... | 317/13 |
| 3,386,032 | 5/1968 | Medlar ....................... | 336/175 X |

Primary Examiner—James D. Trammell
Attorney—Russell H. Clark

ABSTRACT: Overload and other excessive current conditions as regards an electric motor are sensed by current sensing loops which form the primary winding of respective transformers. The voltage developed across the secondary windings are rectified and supplied to a deenergizing circuit which additionally includes a holding circuit and a timing circuit. In the event of an overload condition, the current supply to the electric motor is interrupted and also a time delay is effected before reset occurs assuming that electric power is again available.

PATENTED AUG 31 1971　　　　　　　　　3,602,771

Inventors.
Dennis C. Walstad,
Dale F. Willcox, &
Walter R. Knopf.

By Hume Clement Hume & Lee
Attys.

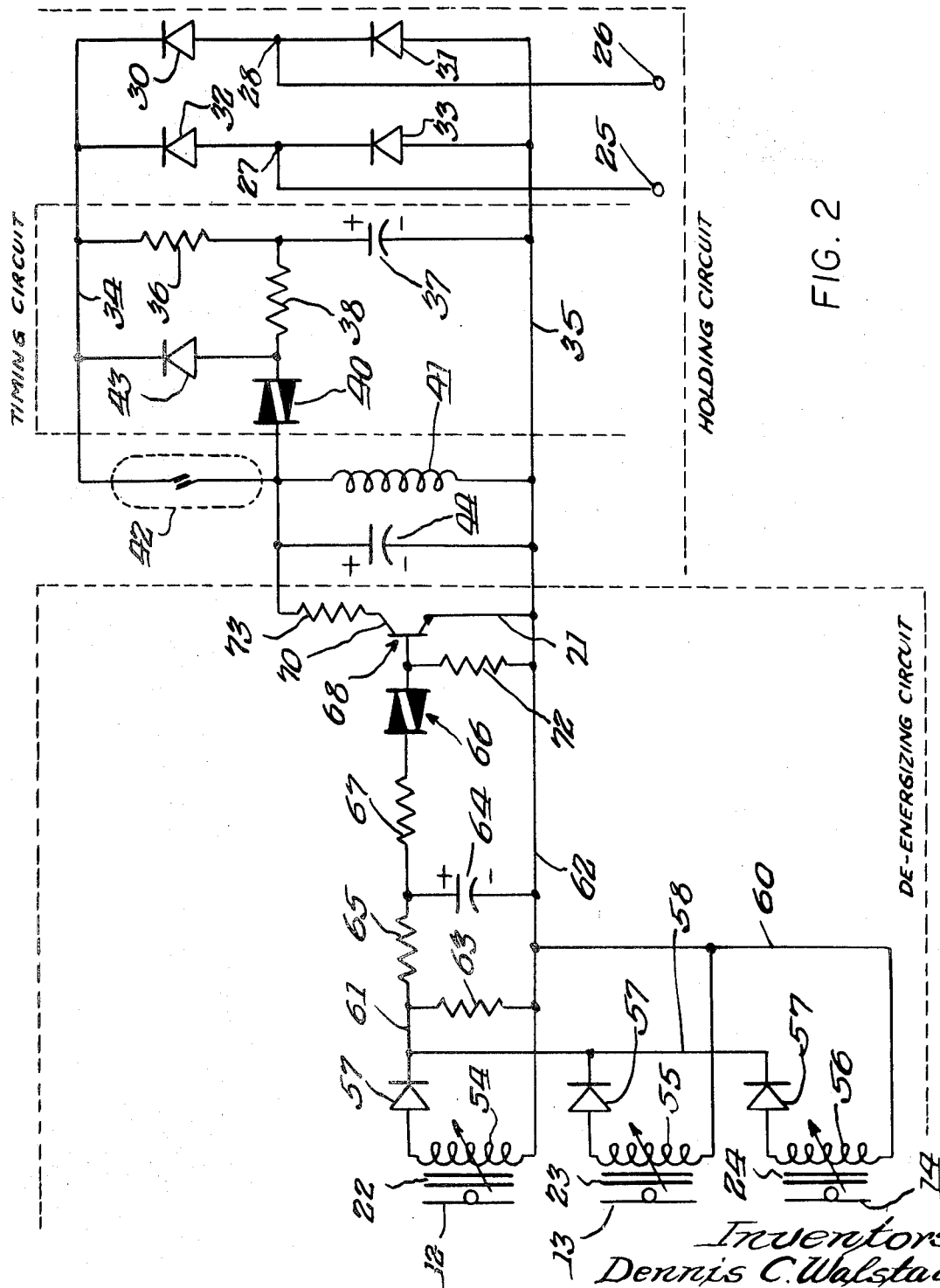

SOLID STATE DEENERGIZER HAVING CURRENT SENSING LOOPS

The invention relates to an electronic control device which is sensitive to current flow and has reference more particularly to a solid state deenergize, having current sensing loops for controlling electric motors and the like.

The control device of the invention includes a holding circuit, a timing circuit and a deenergizing circuit which is sensitive to current flow. The holding circuit will remain in either an on or off condition until it is switched from one to the other. For example, if the holding circuit is off, it can be turned on by the operation of the timing circuit. If it is on, it can be turned off by either the overload current deenergizing circuit or any momentary interruption of the external power supply such as may be caused by lightning or excessive chattering of the thermostat or other control switches. The timing circuit is activated when the holding circuit is off and voltage is present across the control terminals. The reset time of the timing circuit following deenergization under any conditions can be preselected and is generally a matter of 1, 2, 3 minutes. The circuit will automatically reset and complete the motor circuit after power is restored and the time interval has elapsed.

The basic improvement which has been incorporated in the present control device resides in the provision of a deenergizing circuit which is sensitive to the current flowing in the conductors supplying power to the electric motor. Sensing transformers convert motor current flowing through sensing loops to a proportional alternating current voltage. Each transformer is composed of a wound coil which serves as the transformer secondary and a metal loop with an adjustable air gap which serves as the transformer core. The primary of the transformer is the motor lead which passes through the metal sensing loop.

In view of the foregoing an objective of the invention is to provide a control device of the solid state type which will protect an electric motor or the like from an overload condition and which will also incorporate a time delay feature preventing operation of the motor following deenergization for any reason until after a preselected time interval has elapsed.

Another object of the invention is to provide a control device as described which will employ current sensing loops and an electronic circuit in electrical connection with the loops for sensing an overload condition as regards current flow to the motor and which will effect deenergization of the motor when overload conditions exceed a preselected value and exist for longer than a predetermined time.

Another object is to provide a control device having current sensing loops as described and wherein each loop serves as a transformer core and has a built-in air gap to provide a method of calibration by allowing the primary inductance to be increased or decreased by a small amount. The air gap is opened or closed by a screw adjustment.

A further object is to provide a solid state control device having current sensing loops and which is not position sensitive or vibration sensitive and wherein the motor leads pass through the loops which are conveniently located on top of the device, thus eliminating all jumpers and connections heretofore necessary when overload relays were used.

With these and various other objects in view the invention may consist of certain novel features of construction and operation as will be more fully described and particularly pointed out in the specification, drawings and claims appended thereto. In the drawings which illustrate an embodiment of the device and wherein like reference characters are used to designate like parts:

FIG. 2 is a diagrammatic view of the present control circuit and which illustrates in combination the holding circuit, the timing circuit and the deenergizing circuit;

Figure 1:
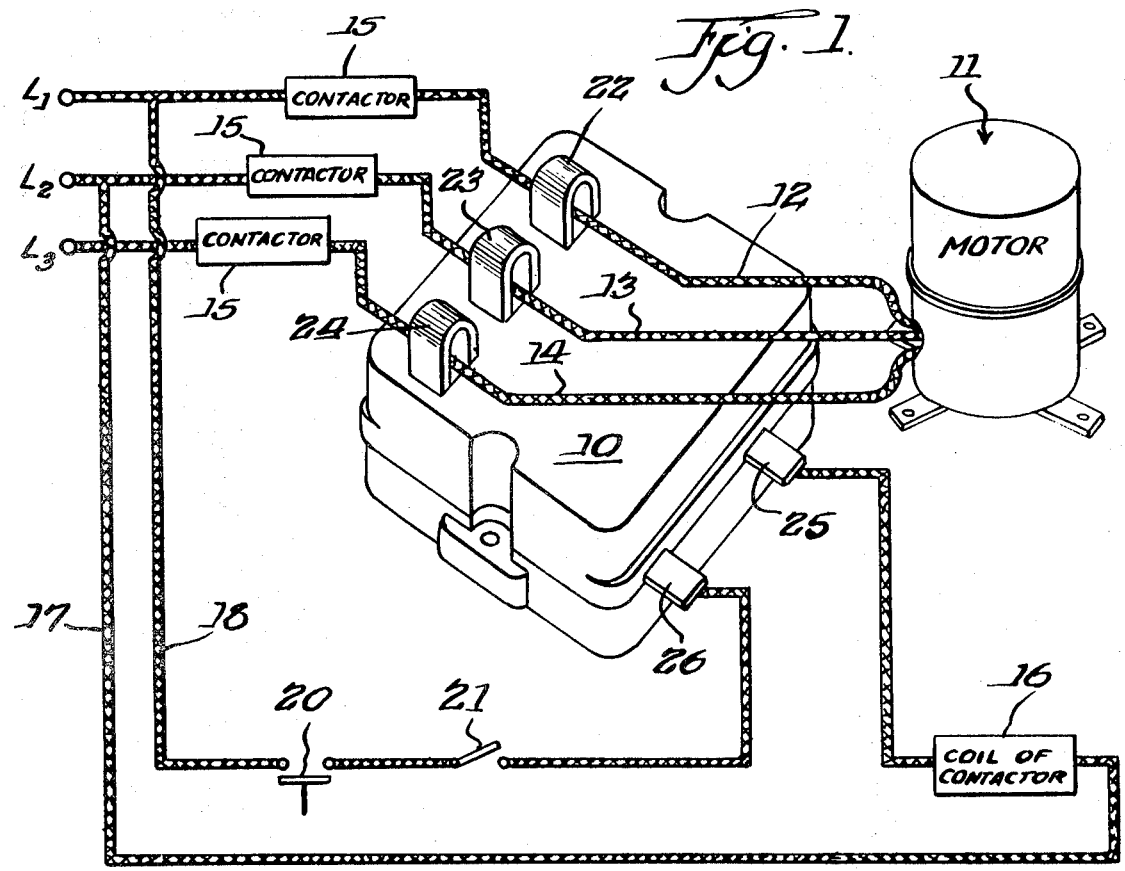
FIG. 1 is a perspective view of the present control device and which illustrates diagrammatically the electrical connections for the same for controlling an electric motor.

The diagrammatic circuit arrangement shown in FIG. 1 illustrates the circuit connections for the present control device 10 for controlling an electric motor such as 11. The motor may be a compressor motor such as may be used in air conditioning equipment and the conductors 12, 13 and 14 electrically connect the motor to the terminals $L_1$, $L_2$, and $L_3$ of a source of three-phase alternating current. Switching means in the form of a motor contactor 15 is interposed in the conductors 12, 13 and 14 and the coil of said contactors indicated by the numeral 16 is connected across the power source in shunt relation with the motor 11 by the conductors 17 and 18. The control switches such as the pressure switch 20 and the thermostatic switch 21 are located in the conductor 18 in series relation with the control device 10 and the contactor coil 16. It will also be observed that the conductors 12, 13 and 14 pass through the metal loops 22, 23 and 24 which comprise the current sensing loops of the control device.

FIG. 2 shows in diagrammatic form the circuit arrangements which make up the control device 10, the same including a holding circuit, a timing circuit and a deenergizing circuit. The conductors 17 and 18 are connected to the two terminals 25 and 26, respectively, and which in turn connect with the terminals 27 and 28 of a diode bridge formed by the rectifiers 30, 31, 32 and 33. It will thus be seen that the conductor 34 comprises the positive side of the bridge and the conductor 35 the negative side. The resistor 36 and the capacitor 37 are joined in series and connected across the conductors 34 and 35. The resistance 36 has a relatively high value in ohms on the order of 1.5 megohms so as to achieve the desired slow charging rate for the condenser 37 which has a capacity of about 200 microfarads at approximately 75 volts maximum. The values of the resistor 36 and the series connected condenser 37 are selected for the time delay interval desired. The values as stated will give a time delay interval of about 2 minutes before a voltage of about 60 volts is impressed by the charging condenser 37 across the terminals of the trigger diode or diac 40. When this occurs the trigger diode switch will close and the condenser 37 will discharge through the relatively low ohmic resistor 38 and through the trigger diode to cause current to flow in the inductance coil 41. The trigger diode or diac is a switching device sensitive to voltage. The same is normally open but when subjected to a voltage of about 60 volts, having been selected for the particular circuit values as given, the diac will close to discharge the condenser 37.

The coil 41 is in series connected relation with the reed switch 42 and the two elements are connected across the conductors 34 and 35 in parallel relation with the series connected resistor 36 and capacitor 37. The reed switch provides a switch of the magnetically actuated type and the same is actuated to close by the flux caused by current flow through the coil 41. The physical arrangement of the elements is such that the coil is wound around the glass enclosing envelope of the reed switch. Accordingly upon discharge of the condenser 37 and current flow through the coil 41, the reed switch 42 will close and the current will thereupon bypass the high ohmic resistor 36 and take the low impedance path provided by the reed switch and coil. The rectifying element 43 is connected between the resistor 38 and diac 40 and at its opposite end to the conductor 34. When the reed switch closes the rectifying element 43 provides a path for complete discharge of the condenser 37. It is necessary for the condenser to discharge fully and completely, since if any charge should remain the time interval on the next operation would be reduced proportionately.

The condenser 44 is connected across the inductance coil 41 in order to smooth out the pulses of the full wave rectified current and to maintain current flow through the coil even when the half wave pulses attain a minimum or zero voltage. It is necessary to maintain current flow through the coil or else the reed switch would inadvertently open. For a more complete understanding of the timing circuit and the holding circuit reference is made to a copending application in the names of Ernie Foldvari and Dennis C. Walstad, Ser. No. 858,993, filed Sept. 18, 1969 and entitled "Impedance Switching Timer."

Figure 3:
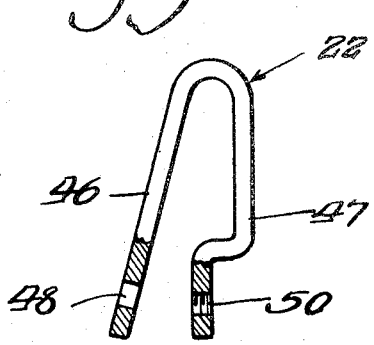
FIG. 3 is an elevational view of one of the metal current-sensing loops.
Figure 4:
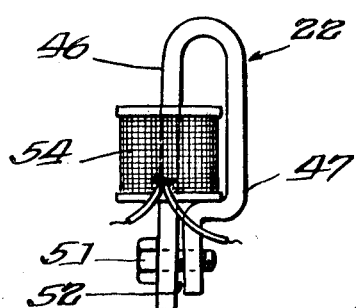
FIG. 4 is an elevational view of a current sensing loop such as shown in FIG. 3 following assembly therewith of a transformer secondary coil and adjustable closure of the air gap.

The deenergizing circuit includes the metal loops 22, 23 and 24 shown in FIG. 1 and which form the core of transformers for sensing the current flow in the conductors 12, 13 and 14. FIG. 3 shows one of the loops such as 22 and which is formed of metal, preferably magnet steel, and which has a straight leg 46 and a bent leg 47. Both legs are apertured at 48 and 50, respectively, with the opening 50 being threaded for receiving the threaded screw 51 as shown in FIG. 4. The secondary coil 54 is assembled on the leg 46 before the legs are joined or connected by the screw 51. Also it will be understood that the screw 51 renders the legs adjustable so that the air gap indicated by numeral 52 can be varied for purposes which will be presently explained in detail.

Referring again to FIG. 2 wherein three transformers are shown for the three-phase current, it will be observed that each transformer has a secondary winding 54, 55 and 56, respectively, with the metal loops forming the core for the transformers and wherein the primary is formed by one of the conductors 12, 13 and 14 which supply the three-phase current to the motor. The conductor may pass through its loop as shown in FIG. 1 or the conductor may have one or more turns around its loop as diagrammatically indicated in FIG. 2. Each secondary circuit includes the series connected diode 57 for rectifying the induced alternating current and each secondary circuit is connected in parallel relation by the conductors 58 and 60 with the conductors 61 and 62 which contain elements that sense the magnitude of the positive current pulses supplied thereto by the inductive action of the transformers.

The output of the sensing transformers is a pulsating direct current voltage and which is supplied to the resistor 63 connected across the conductors 61 and 62. This voltage is used to charge the capacitor 64 through the resistor 65. The voltage to which the capacitor is charged is sensed by the trigger diode or diac 66. Here again the trigger diode has been selected so that the same remains open until the condenser 64 attains a predetermined charge, and when this is impressed across the terminals of the trigger diode it closes to permit the condenser 64 to discharge through the resistor 67 and through the trigger diode to thus energize the base of the NPN transistor 68. The transistor has a collector 70 and an emitter 71, the said transistor thus being connected across the inductance coil 41 in parallel with the condenser 44. When the condenser 64 discharges through the trigger diode into the base of the transistor 68, it saturates the said base. When the base of the transistor becomes saturated, the current flowing through the reed switch 42 is diverted away from the coil 41 and through the transistor 68 thus causing the reed switch to open. With the opening of the reed switch the holding circuit returns to an off state, the contactor coil 16 is deenergized and the contactor 15 opens to stop operation of the motor 11.

The purpose of the resistor 65 is to provide, together with the capacitor 64, the correct inverse time current trip characteristic. The resistor 63 acts as a discharge path for 64 to reset the time delay of the trip characteristic. The resistor 67 limits the discharge current of condenser 64 and extends the discharge pulse time in doing so. The resistor 72 provides a path for the leakage current from the trigger diode 66 so as to prevent a false turn on of the transistor 68. The resistor 73 in series with collector 70 is a current limiting resistor to protect the transistor from excessive current pulses.

When the control switches 20 and 21 are closed the circuit as shown in FIG. 2 is connected across the phase $L_1$, $L_2$ of the power source. The diode bridge effects a full wave rectification of the alternating current and the capacitor 37 starts to charge at a rate determined by the ohmic value of the resistor 36. Following a predetermined time delay, the charge impressed by the condenser 37 on the terminals of the trigger diode 40 will be sufficient to cause the diode to close and the condenser is discharged through the coil 41. This current flow through the coil will close the reed switch 42 and the circuit is thus closed to energize the contactor coil 16 and close the contactor 15 to start operation of motor 11. The time delay may be a matter of 2 or 3 minutes. Even if power is restored the device will automatically reset only after the set time has elapsed. This period of the time delay helps provide excellent locked rotor protection since the deenergizing circuit will take the motor off the line in approximately 1 second and the device will not reset until the delay time has elapsed.

During operation of the motor, should an overload occur for any reason the motor certain will open the same as a conventional overload relay would do. In the circuit as disclosed the motor current passing through the loops generates a small inductive voltage and which may be increased by the turns ratio of the transformer. It is this voltage that is sensed by the condenser 64 and if the same is sufficient and if it exists for a certain preset time then the condenser will have charged to a value causing the trigger diode 66 to energize the transistor 68.

For three-phase applications all three loops 22, 23 and 24 have the same sensitivity and the same trip characteristics which is determined by the magnitude and duration of the overload before deenergization of the motor occurs. The value in ohms of the resistor 65 with respect to the capacitor 64 will determine the trip out time and which will be on the order of 1 or 2 seconds. Fine adjustments as regards the transformers can be made by adjusting the air gap 52 which can be opened or closed by the screw 51. This method of calibration allows the primary inductance to be increased or decreased by a small amount. Variation of the primary inductance will cause the voltage developed across the secondary winding for any given current to change proportionally.

The deenergizing circuit may have a wide range of reset time by adjusting the values of the resistor 36 with respect to the capacitor 37. Also the time delay of the trip characteristic can be adjusted by manipulating the values of 65 and 64. For an excessive overload current it is desirable that the device trip immediately, such as within one second. However, for an overload which may be negligible or a minimum the device will not trip unless the same should exist for some time.

The deenergizer can be built for three-phase, single-phase, or for single-phase with a hard start provision. For three-phase applications all three loops have the same sensitivity and time trip characteristics. On single-phase applications either one or two lines can be monitored. On single-phase hard start applications, the device can be built with one line to have one trip characteristic an the other line to have an entirely different current and trip characteristic.

What is claimed is:

1. In a control device for controlling the operation of an electric motor or the like, the combination with a source of electric current, of conductors connecting the current supply source with the motor, a contactor for controlling flow of said current to the motor, said contactor having a coil in series connected relation with the control device and which when energized causes the contactor to close, said device including current sensing loops formed of metal and which comprise the core of respective transformers, each current sensing loop having one of said conductors passing through the loop and which forms the primary winding of the respective transformers, each of said transformers having a secondary winding in inductive relation with its loop, a current sensing circuit in electrical connection with the secondary windings for sensing the magnitude and duration of excessive peak currents flowing in the conductors which pass through the said loops, a timing circuit consisting of a resistor and a first condenser, said resistor having a relatively high ohmic value and having a series connected relation with the first condenser, a parallel conducting circuit consisting of a magnetically actuated reed switch and an inductance coil, said reed switch and coil having a series connected relation and said coil having an inductive relation with the reed switch, whereby the reed switch closes when current is caused to flow through the inductance coil, said inductance coil and the reed switch when closed providing a current path of less impedance than the resistor-first condenser series circuit, a trigger diode which is sensitive to voltage in electrical connection with the secondary windings and forming an element of the sensing circuit, a second condenser in electrical connection with the trigger diode and being located between the same and the secondary windings, whereby when the second condenser is charged to a preselected voltage the diode closes to discharge the same and cause current to flow through the diode, and means including a transistor so connected to the diode that its base is energized upon current flowing through the diode, and said transistor having electrical connection in shunt relation across the inductance coil, whereby current flow through the coil is terminated when the base of the transistor is energized.

2. A control device for controlling the operation of an electric motor or the like as defined by claim 1, wherein the transistor is of the NPN-type, and wherein the second condenser discharges through the trigger diode to energize the base of the transistor when a current of overload magnitude and existing for a predetermined period of time is sensed by the current sensing circuit, whereby current flow through the inductance coil is terminated and the reed switch opens to deenergize the contactor coil and stop operation of the motor.

3. In a control device for controlling the operation of an electric motor or the like, the combination with a current supply source, of conductors connecting the current supply source with the motor, a contactor for controlling flow of said current to the motor, said contactor having a coil which when energized causes the contactor to close, said coil having a series connected relation with said control device and the said series connected arrangement being connected across the current supply source in shunt relation with the motor but in advance of the contactor, said device including current sensing loops formed of metal and which comprise the core of respective transformers, each current sensing loop having one of said conductors which connect the contactor with the motor passing through the loop and which form the primary winding of the respective transformers, each of said transformers having a secondary winding in inductive relation with its loop, a current sensing circuit in connected relation with the secondary windings of the transformers, rectifying means in the circuit of each secondary winding, whereby the sensing circuit is supplied with pulsating direct current, said sensing circuit including a first condenser connected across the terminals of the sensing circuit, a transistor, a trigger diode connected between the first condenser and the base of the transistor, whereby when the first condenser is charged to a preselected voltage the trigger diode is caused to close and the first condenser is discharged through the same to saturate the base of the transistor, and a holding circuit in electrical connection with the transistor, said holding circuit operating to interrupt the shunt connection when the base of the transistor is saturated to thereby deenergize the contactor coil and terminate current to the motor.

4. A control device for controlling the operation of an electric motor or the like as defined by claim 3, wherein the sensing circuit includes a first resistor in series with the trigger diode and located in advance of the first condenser between the same and the secondary windings, said first resistor having a value in ohms selected for predetermining the charging rate of the said first condenser.

5. A control device for controlling the operation of an electric motor or the like as defined by claim 3, wherein the sensing circuit includes a first resistor in series with the trigger diode and located in advance of the first condenser between the same and the secondary windings, said first resistor having a value in ohms selected for predetermining the charging rate of the first condenser, and 9 second resistor connected in parallel relation with the first condenser and between the first resistor and the secondary windings, said second resistor providing a discharge path for the first condenser so that the same may discharge to a full extent on each discharging operation.